Dec. 23, 1958  J. E. BROWN ET AL  2,865,282
TOASTERS
Filed Nov. 21, 1956  2 Sheets-Sheet 1
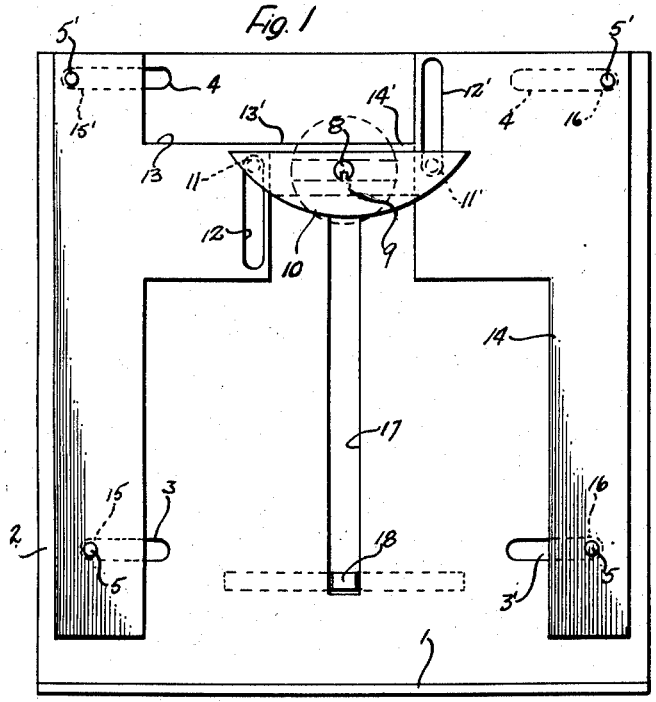
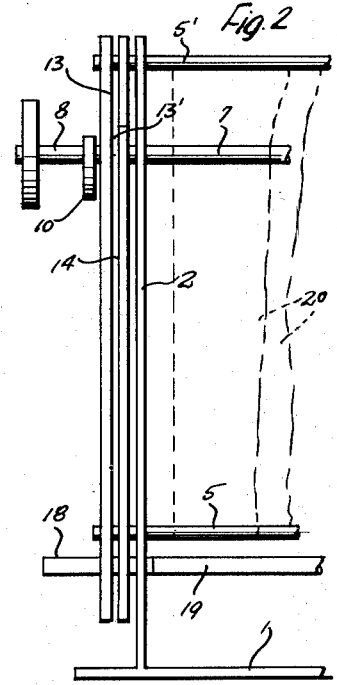
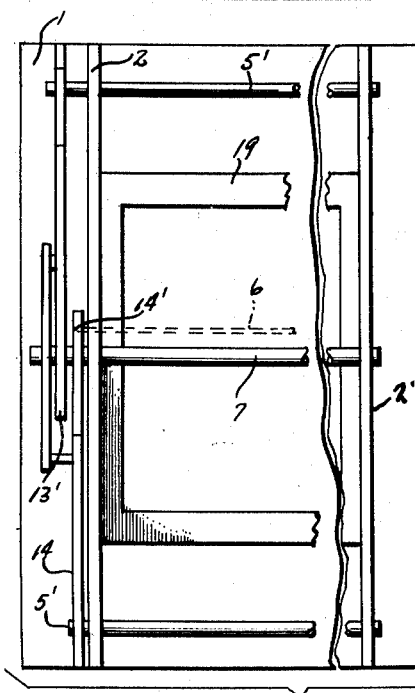
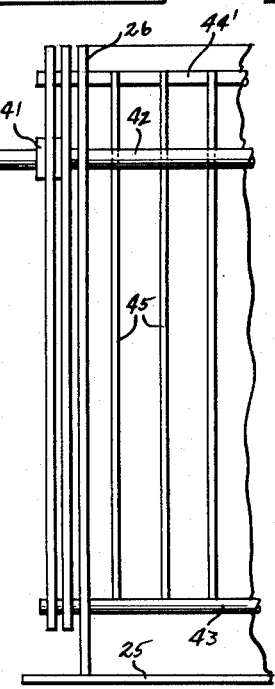
Jack E. Brown
George Koslow
INVENTORS Dec. 23, 1958     J. E. BROWN ET AL     2,865,282
TOASTERS
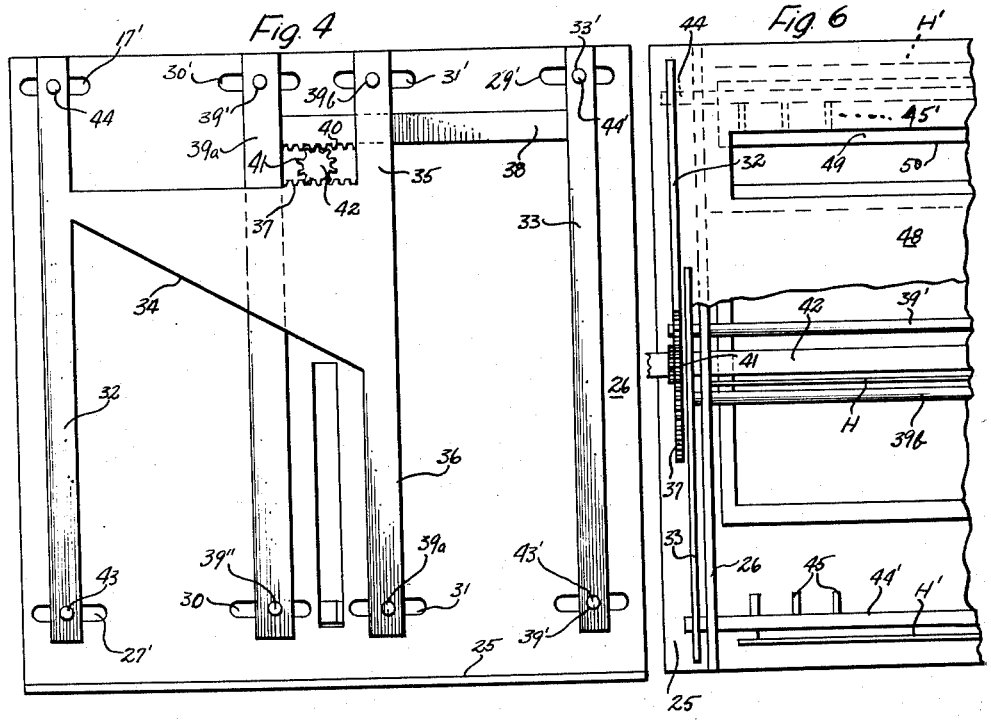
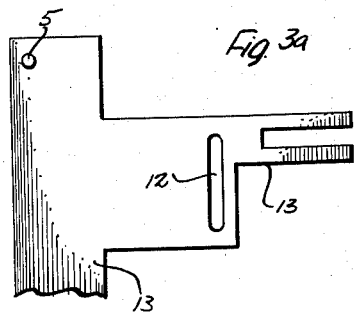
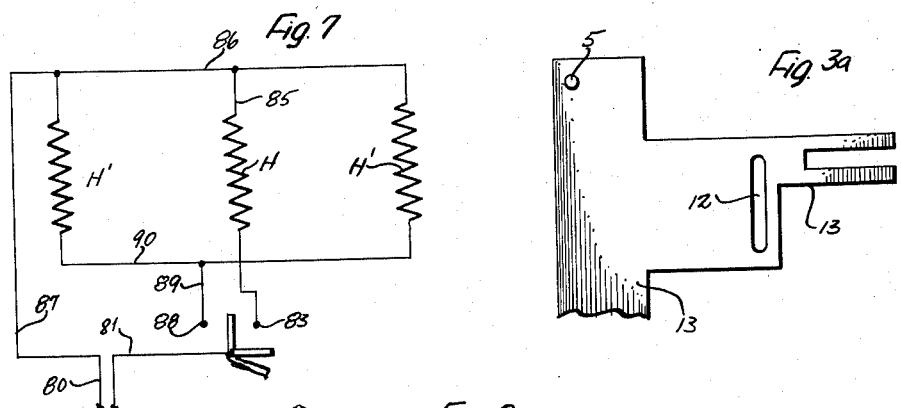
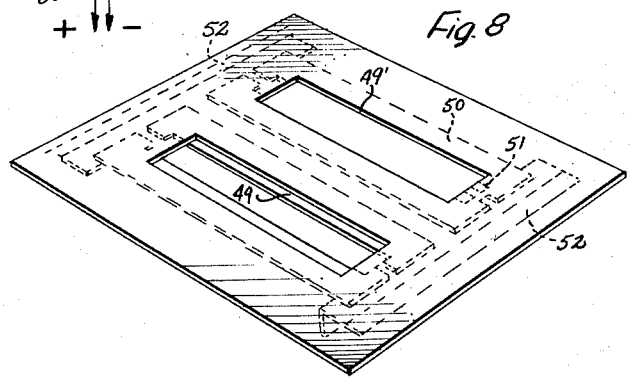
Jack E. Brown
George Koslow
      INVENTORS

2,865,282

TOASTERS

Jack E. Brown, Brooklyn, and George Koslow, New York, N. Y.

Application November 21, 1956, Serial No. 623,663

6 Claims. (Cl. 99—390)

An object of the invention is the provision of a novel means whereby the slice receiving compartments may be widened or made narrower, by the simple turning of a knob or handle, to either move the two outer heating units to or from the center heating unit, and/or move the slice limiting means associated with such movable units.

In order that the invention may be fully understood and its many advantages appreciated, attention is invited to the accompanying drawings, in which:

Figure 1 is a partial front view of the inner operative part of the electric toaster, embodying the present invention.

Figure 2 is a partial side view thereof.

Figure 3 is a top plan view of part of the same, with the cover removed.

Figure 3a is a plan view of one of the forked ends of one operator.

Figure 4 is a view similar to Fig. 1, of one modification of the toaster.

Figure 5 is a view similar to Fig. 2 of the same modification.

Figure 6 is a top view thereof, similar to Fig. 3.

Figure 7 is an electric diagram of a selective circuit, whereby all three or only one heating unit may be energized.

Figure 8 is a perspective view of the top of the toaster used in both constructions.

Referring to Figs. 1–3, the numeral 1 designates a base plate, which forms the main support for the toaster elements and has attached thereto the panel 2 and the rear panel, not shown, form the supporting structure. Connected to and supported on the panel 2, are the operative elements. Said panel 2 is provided with slots 3—3' and 4—4', as well as a slot 17, so that rods 5—5' may be mounted as shown for parallel horizontal movements. Heating units 20 are supported by the respective rods 5—5', and by this arrangement, as the rods are moved to and from the center, the heating units are also moved to and from the center heating unit 6, which is fixedly mounted in the toaster and supported by the panels 2 and 2'.

In order that these actions may be accomplished, two operators 13 and 14 are provided, and these are in the form of shaped plates, the operator 13 being provided with a vertical slot 12 and with apertures 15—15', while the operator 14 is provided with a slot 12' and apertures 16—16', and with a forked terminal 14', while the operator 13 is provided with a forked terminal 13'. By this construction the two heating units 20 are supported by and between the rods 5—5' at each side of the toaster. Thus these units can be moved toward or away from the fixed heating unit 6 to decrease or increase the space between these units 20 and the fixed unit 6. Thus thin to thick slices, English muffins and the like can be toasted.

An operating shaft 7 for imparting movement to the plates and heating unit operators 13 and 14 is mounted centrally of and in the front and rear panels, and has keyed at 9, to the front end thereof, a segmental plate 10, carrying fixed pins 11—11' that ride in the respective slots 12—12', so that as the shaft 7 is oscillated the two operators 13 and 14 are moved toward or away from the center of the toaster, and as the rods 5—5' are attached through the openings 15—15' and 16—16' to their respective operators, the heating units 20 and 21 are moved toward or away from the center heating unit 6. By this means the space to receive a slice of bread or other objects as waffles, English muffins and the like may be widened or narrowed to bring the heating units into the best toasting relation with such objects.

Any form of slice elevator may be employed, but in this instance, is shown an open frame elevator 19 with two hand grip members 18, one at the front and one at the rear, these latter members being slidably movable in the vertical slots 17 of the respective panels 2—2'. These can be heat or thermo control, and are here illustrated diagrammatically.

By this arrangement, it will be seen, that when a cover, not shown, conceals this mechanism, that slices of bread or other objects to be toasted may be placed within the toaster upon the elevator, and the shaft 8 oscillated or rotated to move the heating units toward or away from the fixed heating unit 6, and thus provide an adjustable toaster.

As shown in Figs. 4–6, a base plate 25, has mounted thereon a panel 26, here at its front, but it is understood that at the rear this is duplicated. Each panel is provided with slots, 27', 28', 30—30' and 31—31', the purposes of which will presently appear. Two operators 32 and 33, respectively are provided, and the operator 32 is provided with a wing 34, having a short leg 35 and a long leg 36, and with a toothed edge 37 on the wing.

Rods 43—44 and 43'—44', are arranged in pairs and their respective ends ride in the respective slots 27—17' and 28—28', and which rods carry bread guard wires 45, so that as the operators 32—33 are moved to and from each other these bread guard wires are moved to regulate the width of the bread receiving spaces of the toaster. Bodily carried by the respective pairs of rods 43—43' and 44—44', is a heating unit H', with the wire guards on the inner side, so that the element to be toasted, is not in direct contact with the respective heating units H'. The operator 33 to accomplish this has the projected ends of the rods 43'—44' anchored in their respective ends 33'—33', while its connector plate 38, with the vertical terminal 39a, operates the rods 39'—39", in slots 30—30', the terminals 35—36 of the operator 32, being attached to the projected ends of rods 39a—39b, so that they can be moved in their respective slots 31—31'.

These rods 43—44 and 43'—44', carry each a series of bread guides 45—45', as do the rods 39'—39" and 39a—39b, so that width of the slice capacity, without adjusting the heating units 46, 46' and 47, are not moved.

To accomplish this movement, a gear 41 is fixed to the operating shaft or rod 42, which is mounted in the front and rear panels, and is oscillated to move the gear, which meshing with the toothed edges 37 and 40, imparts sliding movements to the two operators 32 and 33.

A portion of one type of cover that may be provided for this toaster, is shown in Fig. 8, where the cover 48, is provided with two slice receiving slots, while to adjust the width of such slots, two plates, such as plate 50, are under the cover, and mounted upon guides 52, so that plate 50 with its two slotted right-angle lugs 51 may straddle its rod 39" or 39b, and be moved by the respective operators 32—33 to increase or decrease the slice receiving openings.

By this construction, the width of the slice receiving cavity is adjusted to receive various widths of sliced bread or other objects to be toasted, and without moving the heating units, and an elevator 53, as before set forth, slides in the vertical slots 29 of the two panels.

However, if so desired, the two heating units 46—46', may be carried by the respective pairs of rods 43—44 and 43'—44', leaving the center heating unit in a fixed position.

In Fig. 7, an electrical diagram is shown for controlling the energization of the heating units of these various forms of electric toasters, and this consists of a plug 80, having a conductor 81 lead therefrom to the pivoted finger operated double winged switch 82, which may be indicative of any type of switch that will answer the purpose, as one controlled by the slice. When the switch is engaging contacts 83 and 88, simultaneously, but when only contact 83 is engaged, a circuit is closed to a single unit H, through conductors 84, 85, 86, 87 and the plug 80, and conductor 81, and switch 82. When it is desired to have all three heating units H—H' energized, the circuit consists of plug 80, conductor 81, switch 82, contacts 83 and 88, conductors 89 and 90, all three heating units H—H', which are connected in parallel, conductors 85 and 87 and plug 80. Thus, this circuit permits the energization of the center unit H to toast only one side of the slice of muffin, while when the three units are energized both sides of the slices or muffins are toasted.

What is claimed is:

1. An electric toaster, including a base plate, a rear and a front panel carried by the base plate, a cover provided with two spaced slice directing openings, two slides mounted in the cover, one to each opening for varying the slice width of such openings, a central heating unit mounted between the panels and providing slice receiving compartments on both sides theerof, a slice elevator mounted for vertical movement in the panels and in the compartments, two cooperating heating units, one to each respective panel mounted in the panels for sliding movements to and from the central heating unit, and means mounted in one of the panels for imparting simultaneous sliding movements to the latter two heating units to increase or decrease the slice receiving compartments and for moving the two slides to vary the width of the slice directing openings relatively to the distance between the central heating unit and the two adjustable heating units.

2. An electric toaster, including a base plate, a rear and a front panel carried thereby, said panels being provided with two pairs of slots, two pairs of shafts mounted in the respective slots for sliding movements therein, a heating unit carried by each pair of shafts and bodily moveable therewith, a fixed heating unit mounted in the panels and providing with the movable heat-units two slice receiving compartments, means mounted upon the front panel for selectively moving the shafts and the heating units carried thereby to increase or reduce the width of the respective slice compartments, and a double slice elevator mounted between the panels and movable within the compartments.

3. An electric toaster as claimed in claim 2, wherein the means for selectively moving the shafts and heating units, consists of two plates, each of which is connected to its respective pair of shafts, a central shaft mounted in the upper portion of the panels and having one end extended exteriorly of the front panel and constituting a finger grip, and cooperative means carried by the shaft and the two plates, whereby the oscillation of the shaft causes the movement of the plates to impart horizontal sliding movements to the heating units.

4. An electric toaster as claimed in claim 2, wherein the means for selectively moving the shaft and heating elements, consists of two plates, each of which is connected to its respective pair of shafts, a central shaft mounted in the upper portion of the panels and having one end extended exteriorly of the front panel and constituting a finger grip, a curved segmental plate fixed to said shaft and cooperatively attached to both plates, whereby when the shaft is oscillated the plates are moved to impart movement to the shaft carried heating units.

5. An electric toaster as claimed in claim 2, wherein the means for selectively moving the shaft and heating units, consists of two plates, each of which is connected to its respective pair of shafts, a central shaft mounted in the upper portion of the panels and having one end exteriorly of the front panel and constituting a finger grip, a gear carried by said shaft, and two racks one of each plate meshing with said gear, whereby as the shaft carrying the gear is rotated in one direction the two plates will be moved toward each other and vice versa, and whereby the heating units are moved similarly.

6. An electric toaster, including a base plate, a front and a rear panel carried upon and projecting from the base in spaced relation, a fixed heating unit vertically supported centrally of and between the panels, two cooperating heating units spaced from the fixed unit to provide two slice receiving compartments, two slice elevators, one to each compartment slidable vertically between the panels, a cover supported by the panels and provided with two rectangular slice directing openings, one opening above each slice compartment, a slide carried by the cover for each opening to adjust the size of the opening in accordance with the width of the slice receiving compartments, and manually operable means for simultaneously moving the two cooperating heating units and the two slides to increase or decrease the widths of the slice compartments and the openings of the cover.

References Cited in the file of this patent
UNITED STATES PATENTS

| | | |
|---|---|---|
| 1,687,712 | Chandler | Oct. 16, 1928 |
| 1,729,937 | Ginder | Oct. 1, 1929 |
| 2,347,385 | Wright et al. | Apr. 25, 1944 |
| 2,764,081 | Glasser | Sept. 25, 1956 |
| 2,788,734 | Weeks | Apr. 16, 1957 |
| 2,816,501 | Meyers | Dec. 17, 1957 |